Jan. 22, 1957  J. V. ROOK  2,778,463
COMBINATION FUEL AND BRAKE CONTROL FOR MOTOR VEHICLES
Original Filed June 16, 1954  2 Sheets-Sheet 1

INVENTOR.
J. V. Rook
BY
Atty.

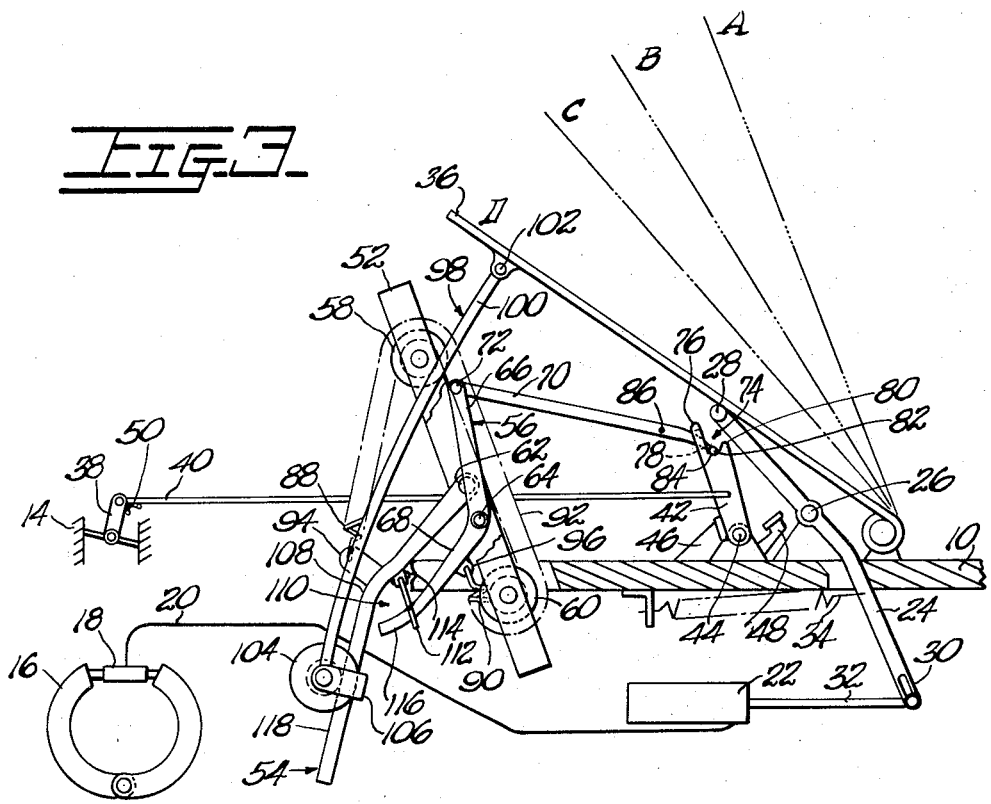
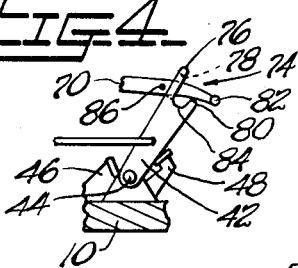
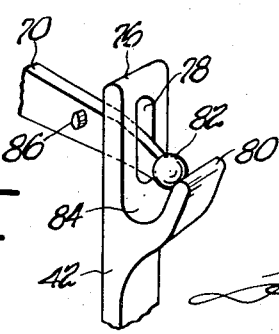
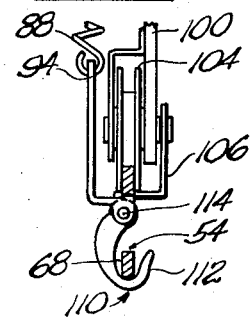

United States Patent Office 2,778,463
Patented Jan. 22, 1957

2,778,463

COMBINATION FUEL AND BRAKE CONTROL FOR MOTOR VEHICLES

Joseph V. Rook, San Antonio, Tex.

Continuation of application Serial No. 437,151, June 16, 1954. This application October 24, 1955, Serial No. 542,236

16 Claims. (Cl. 192—3)

This application is a continuation of copending application Serial No. 437,151, filed June 16, 1954 and the invention relates to a motor vehicle control mechanism of the type in which a single controller, such as a pedal, operates both the brake and fuel systems.

It is of course well known that a moving motor car may be stopped by its own brakes within a certain distance, depending primarily upon its speed and the time involved in the application of the brakes. The time factor is affected by the lapse of time between the driver's cognizance of the peril and the beginning of brake application, commonly known as the "reaction time," which varies according to the individual. Reaction is fairly high because, in the case of a conventionally equipped vehicle, the driver must lift his right foot from the accelerator, transfer it to the brake pedal and then depress the brake pedal. In the interests of eliminating or at least reducing the reaction time, various arrangements have been advanced, the basic characteristic of all of which is the use of a single pedal performing both fuel and brake control functions. Most if not all of these prior systems depend upon movement of the same pedal in the same direction to feed fuel and to apply the brakes, which is obviously inconsistent with the operation of the vehicle and accordingly some provision has to be made to enable one control phase to dominate or override the other, depending upon whether fuel increase or braking action is desired. This requirement necessarily leads to complexity in the system, either structurally or functionally and such systems are difficult for the average driver to comprehend.

According to the present invention, the utmost in simplicity, safety and practicable design is achieved by utilizing a pedal movable forwardly and reversely, or downward and upwardly, through fore and rear consecutive parts of a continuous control range and to regulate fuel supply in one range part and to secure brake action in the other range part, each exclusively of the other. Another feature of the invention is the regulation of the fuel system so as to effect the increase of fuel in the rearward or upward phase of the rear part of the control range, leaving the fore part of the range available for the control of the brakes by the natural forward or downward movement of the pedal. Thus the two types of control are not mutually inconsistent. Another object of the invention is the provision of means for automatically returning the fuel feed member to a fuel decrease or idle position at the rear extreme of the rear part of the control range, so that the car will not "run away" in the event that the driver suddenly removes his foot from the single pedal. A still further object resides in means for automatically re-connecting the fuel feed member to the single pedal upon depression or forward movement of the pedal to the front of the rear part of the range, said connection remaining effective during a major portion of the rear part of the range and enabling fuel increase as the pedal is let up and fuel decrease as the pedal is depressed to the front end of the rear range part. The significance of this feature is that as manual pressure on the pedal is increased the pedal moves naturally from its fuel-control phase into its brake-applying phase. Hence, in an emergency, fuel supply is reduced and the brakes are applied in sequence by one full downstroke of the pedal. It is also an object of the invention to enable the pedal movement in the brake-applying phase to over-run the fuel-control components in the fore part of the control range so that the latter will not interfere with the former, thus avoiding structural and functional complications. Also an important feature of the invention is the provision of an over-running device as part of the force-transmitting means between the fuel feed member and the fuel supply system of the vehicle so as to insure automatic return of the feed member to fuel-decrease position when the pedal reaches substantially the rear extreme of the rear part of its range, which provision is significant in those cases in which a stop or some other obstacle permits less movement of a throttle arm, for example, than is permitted to the fuel feed member.

The foregoing and other important objects and desirable features inherent in and encompassed by the invention will appear as a preferred embodiment of the invention is disclosed, by way of example, in the ensuing specification and accompanying drawings, the several figures of which are described immediately below.

Fig. 3 is a similar view in which the full-line aspect represents application of the brakes and the broken lines show other positions of the pedal.

Fig. 4 is a fragmentary view showing the action of the over-running device in the means between the pedal and the vehicle fuel system.

Fig. 5 is an enlarged perspective of part of the structure shown in Fig. 4.

Fig. 6 is an enlarged end view, partly in section, as seen along the line 6—6 in Fig. 1.

Figure 1:
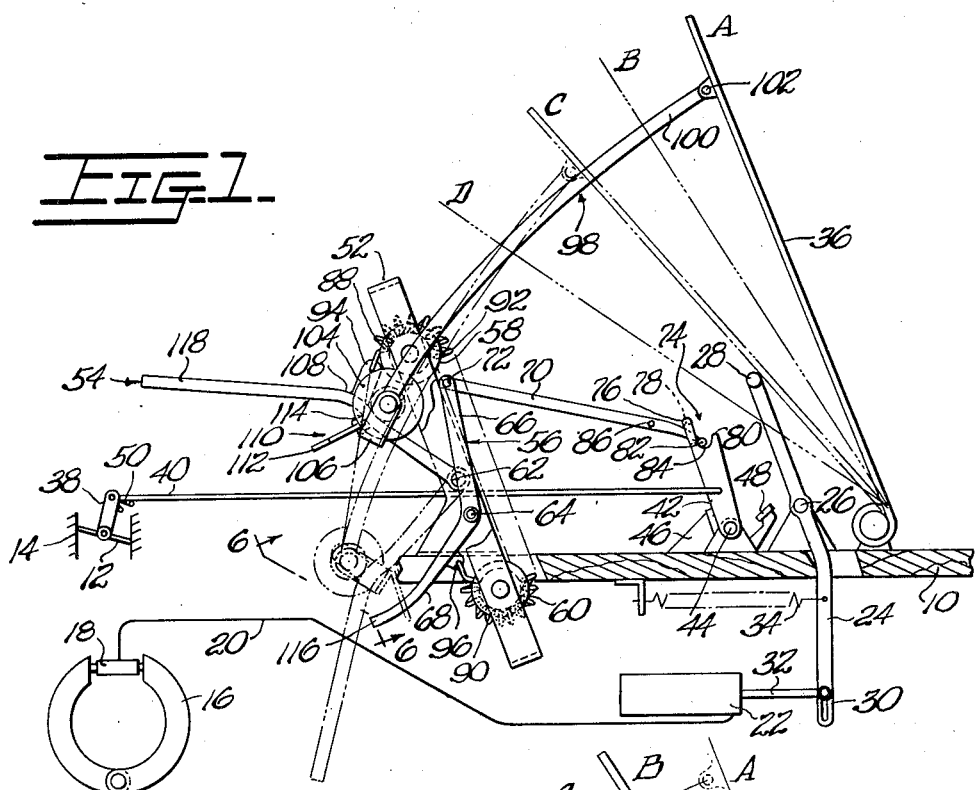
Fig. 1 is an elevation, partly schematic, partly in section and with parts broken away, showing in full lines the neutral or starting phase of the control and showing, in broken lines, other positions of the pedal.

It should be understood at the outset that expressions such as "front," "rear," "upper," "lower," etc, are used solely in the interests of convenience, both in the description and in the claims, and are therefore without limiting significance, for the parts may be otherwise arranged. Likewise, reference to the improvement in connection with the carburetor throttle as shown is illustrative only, since other fuel regulating systems are susceptible to control by mechanism adapted from the embodiment of the invention disclosed here. Features and objects not categorically enumerated herein, as well as modifications of the inventive structure shown, will occur to those versed in the art as the description progresses.

As a basis for illustration, only that portion of a vehicle has been depicted as is deemed necessary to an understanding of the invention. The numeral 10 designates the floor or any other suitable mounting portion of the vehicle main frame or body. A carburetor having a fuel feed control, here a butterfly throttle valve 12, is shown in schematic section at 14. The vehicle brake system is represented schematically by a single brake 16 of the internal-expanding type, the wheel cylinder 18 of which is connected by a fluid line 20 to a master fluid cylinder 22 as is generally conventional. A brake control element or operator 24 is fulcrumed at 26 on the floor 10 and has an upper end offset portion 28 and a depending slotted portion 30, the latter being connected to a piston rod 32 for the master cylinder 22. A spring 34 biases the operator to what may be termed a brake-off position (Figs. 1 and 2) from which position it is movable to a brake-on position (Fig. 3). The upper offset 28 affords means by which the operator is engaged by and disengaged from a single controller or pedal 36, through a control range from A to D and return and including intermediate positions B and C, the operation of which will be described subsequently.

Figure 2:
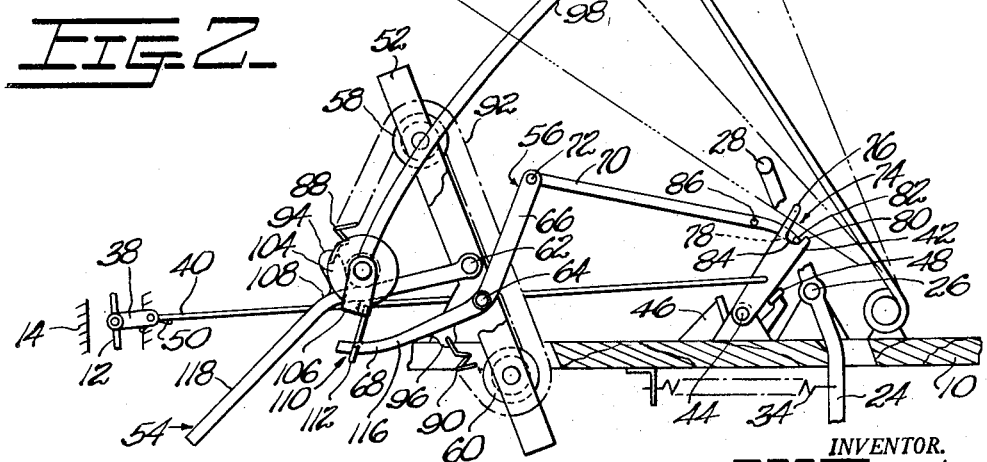
Fig. 2 is a similar view illustrating in full lines the maximum fuel feed position and depicting other pedal positions in broken lines.

The fuel supply system, represented here by the carburetor 14 and throttle 12, is connected via a throttle arm 38 and link 40 to a feed arm 42, which arm is fulcrumed at 44 just ahead of the brake operator 24. The feed arm is limited in its fore-and-aft movement by front and rear stops 46 and 48, respectively, the front stop affording a minimum fuel-decrease or closed-throttle position (Figs. 1 and 3) and the rear stop establishing a maximum fuel-increase or open throttle position (Figs. 2 and 4). A light torsion spring, as at 50, may be used at the pivotal joint between the throttle arm 38 and the link 40 to eliminate a possible dead-center condition.

Rising from and rigidly secured to the floor 10 is a generally upright main support 52 which, as will be apparent, is in the form of a vertically elongated loop for suitably mouting an actuator member or lever 54, a fuel feed member or lever 56, and upper and lower rotatable members or sheaves 58 and 60. The levers are pivoted respectively at 62 and 64 on parallel transverse axes and the sheaves are journaled in a manner that will be obvious. The convenient location of the structure thus far described, relative to a driver's seat (not shown) will readily suggest itself and needs no elaboration.

The feed lever 56 is here in the form of a bell crank having upper and lower arms 66 and 68, and link means 70 extends between a pivotal front connection 72 to the upper arm 66 and a rear connection, designated generally at 74, to the feed arm 42. The rear connection involves an overrunning device or means including a bifurcated upper end on the feed arm, which affords a long furcation 76 having an eye or slot 78 therein and a short furcation 80 of smoothly rounded configuration for suitable cooperation with a ball 82 on the rear end of the link 70. The rear portion of the link passes freely through and is guided by the slot 78 and normally the ball 82 rides in the notch 84 between the furcations 76 and 80 (Figs. 1, 2, 3 and 5), and the link 70 and its connections 72 and 74 serve as force-transmitting means between the feed lever 56 and feed arm 42. Since the arm 42 is connected to the throttle 12, movement of the feed lever 56 controls the position of the throttle. As seen in Fig. 1, when the feed lever 56 is in its down position the throttle is closed (idles the engine) and the feed arm 42 is against its front stop 46, which stop is effective to limit the feed lever to its down or fuel-decrease position because the ball 82 on the link 70 cannot pass forwardly through the slot 78. As shown in Figure 2, when the throttle 12 is open the feed lever 56 is in its up or fuel-increase position and the feed arm 42 is against its rear stop 48. For reasons to be pointed out below the feed lever 56 has a proportionately greater range of upward movement than the feed arm 42 has rearward movement. Hence the provision in the connection 74 for over-ride of the feed arm 42 by the link 70. When the feed arm reaches the stopped position of Fig. 2, the furcation 80 is rearwardly and upwardly inclined at such an angle that even a small amount of rearward thrust in the link 70 will cause the ball 82 to ride upwardly over and rearwardly past the furcation 80, the slot 78 having sufficient vertical length to permit the action (Fig. 4). A stop pin 86 in the link 70 prevents excess rearward movement of the link and effects what may be termed an upper limit on movement of the feed lever 56. When the feed lever returns to its fuel-decrease position, the ball 82 rides forwardly over the furcation 80 and is again received by the notch 84 and, since the ball cannot pass through the slot 78, the link 70 is effective to return the feed arm 42 to its forward position (Fig. 1). It should be understood that the configuration of the components 82 and 80 is such as to minimize friction and avoid the possibility of a lock-up between the feed arm 42 and link 70 during forward movement. In other words, the ball 82 returns freely to its notch 84 before any forward movement is imparted to the feed arm 42.

The actuator lever 54 is biased upwardly or in a fuel-increase direction and the feed lever 56 is biased downwardly or in a fuel-decrease direction by a pair of biasing means, here taking the form of upper and lower end portions 88 and 90 of a tension spring 92 carried by the sheaves 58 and 60. The rear run of the spring is behind the sheaves, the upper spring portion 88 is reeved over the upper sheave and connected at 94 to the actuator lever and the lower spring portion 90 is reeved under the lower sheave and connected at 96 to the lower arm 68 of the feed lever 56. Individual biasing means could be used but the single spring shown has many advantages and is therefore considered novel in the instant environment.

The pedal 36 and actuator 54 are interconnected by a force-transmitting device or means 98 for movement in unison. This means comprises a curved link 100 pivoted at its rear or upper end to the pedal 36 at 102 and journaling a roller or follower 104 at its lower end, which follower rides the actuator 54. A retainer 106 prevents disengagement or untracking between the roller 104 and the actuator. Sufficient lateral offset of the several components is afforded to avoid conflict (Fig. 6), except that the roller 104 is enabled to engage the support 52 at its upper position (Fig. 1) to afford a limit or stop on upward travel of the actuator 54.

Depression or forward movement of the pedal 36 will move the actuator down or in a fuel-decrease direction (as will be clear later) against the action of the biasing means established by the upper portion 88 of the spring 92. When the roller 104 reaches the position of Fig. 2, it encounters on the actuator 54 a hump or cam portion 108 which increases resistance to further forward travel of the roller, which resistance the roller of course can readily overcome. However, the resistance serves as an indicator to the driver that the actuator has reached the Fig. 2 position, which is of extreme significance because it is at that point that pick-up means 110 becomes effective to interconnect the levers 54 and 56 (position C, Fig. 1) for upward movement in unison by the biasing means 88 as manual pressure on the pedal 36 is relaxed thus incurring movement of the feed lever 56 in its fuel-increase direction to open the throttle 12 (full lines, Fig. 2).

The pick-up means here comprises a hook 112 pivoted at 114 to the actuator 54 and adapted when the actuator moves downwardly to cam past the feed lever arm 68 and then to hook under said arm (Fig. 6). In other words, in the starting or neutral position of the mechanism (full lines, Fig. 1) the hook is in disengaged relation to the feed lever but is operative upon depression of the pedal (Fig. 1, position C) to interconnect the two levers 54 and 56 so that when manual pressure on the pedal 36 is relaxed the two levers move upwardly in unison until the full-line position of Fig. 2 is achieved. At this point, the automatic disconnect is incurred, which is occasioned by the hook 112 slipping off of the curved front end 116 of the feed lever arm 68. This will be apparent from considering Fig. 2, wherein it will be seen that the hook 112 is near the front extremity of the lever arm 68 while the pedal 36 is in position B. As long as the pedal movement is limited to the range part BC, the pick-up connection remains in effect. If the pedal is moved from C to D, the feed lever stops but does not interfere with further forward movement of the pedal. If the pedal is released so as to move either suddenly or deliberately to A, the ball 82 on the link 70 over-rides the feed arm 42 (which is now stopped at 48; Fig. 4) and the hook 112 is free to slip off the front end 116 of the feed lever lower arm 68. Depression of the pedal from A to B occurs in an idle or "neutral" zone of the pedal range. Re-connection of the pick-up means occurs at position C. Brake application is effected by pedal movement from C to D. The brakes are released in the D to C zone. Fuel supply is increased in the C to B zone and decreased when the pedal moves from B to C. As stated above, automatic disconnect is effected in the B to A zone.

Another factor affecting operation of the mechanism is the relation and shape of the actuator 54 relative to the arc of pedal travel. As seen in Fig. 1, the actuator extends generally upwardly and forwardly and has a front extension 118 lying in such position as to intersect the pedal arc. Hence, as the pedal is depressed or moved ahead, the actuator is immediately depressed. However, when the actuator attains the broken-line position of Fig. 1, the actuator extension 118 is nearly vertical or approximately tangent to the pedal arc. Therefore, further depression of the pedal will have but little depressive effect on the actuator and the roller merely runs down the actuator extension (Fig. 3). Moreover, the possibility of any effect on or interference from the fuel system while the brakes are being applied is negatived by the one-way effect of the hook, which can exert only a lifting force but never a depressive force on the feed lever.

Operation

The pedal 36 is movable through a continuous control range, the front and rear ends of which are established at D and A, respectively, and the pedal travels forwardly by manual pressure and reversely by the biasing means 88 through this range, being also biased at times by the brake operator spring 34. The control range has a rear part AC and a fore part CD. Fuel control is accomplished in the range part AC (which includes position B) and brake control is achieved in the part CD.

If the vehicle engine has been started but is not in gear, the mechanism is in position A, the pedal 36 fully back and the throttle 12 closed to allow the engine to idle. To start the vehicle moving after it is put in gear, the pedal 36 is depressed to position C, which is indicated to the driver not only by the temporary resistance set up by the hump or cam 108 on the actuator 54 but also by engagement of the pedal with the upper offset 28 on the brake operator 24. At position C, the pick-up means 110 interconnects the levers 54 and 56 and relaxation of pressure on the pedal enables the biasing means or spring portion 88 to move the levers upwardly to open the throttle 12. In the first instance, as the actuator 54 moves down when the pedal travels to C, the spring portion 88 is stretched and at the same time the effective moment arm between the actuator pivot 62 and the spring connection 94 increases, while virtually no change occurs in either the lower spring portion 90 or the moment arm between the feed lever pivot 64 and the lower spring connection 96. Hence the upper biasing means 88 is temporarily stronger than the lower biasing means 90, but as the two levers move up together, the spring 92 rolls around the sheaves 58 and 60 and the spring tension lightens and then remains uniform during throttle control avoiding driver fatigue.

When position B is attained as the pedal moves back or up from C, the upper moment arm is decreasing, as is the tension in the upper spring portion 88, while the reverse is true of the lower moment arm and lower spring portion. However, the levers and pivots are so arranged and designed that the forces operating to move the levers up are always greater than those opposing such upward movement and failure of satisfactory operation cannot occur. Nevertheless, sufficient energy is stored in the lower biasing means 90, upon upward travel of the levers, to positively return the feed lever to its closed-throttle or down position when the pick-up means 110 disconnects as the hook slips off the front end 116 of the feed lever upon release of the pedal for B to A movement.

The vehicle is driven at varying speeds according to regulation of pressure on the pedal 36 in the BC zone. When it is necessary to apply the brakes, the pedal is depressed or moved ahead from C toward D, which also incurs throttle closing action. Thus, in an emergency the driver reacts naturally and in one motion cuts off the fuel or closes the throttle and applies the brake. To pick up speed, he merely relaxes pressure on the pedal and the brakes are released and fuel is increased on the upward or rearward stroke or travel of the pedal. The two range parts are mutually exclusive and there is no interference of one control phase with the other. Operation is substantially without departure from conventional or natural operation except for the reversal of fuel control, which can be readily learned by the average driver. The automatic disconnect at 74 assures fuel cut-off or closed throttle even though the feed arm 42 stops before the feed lever moves up far enough to slip the hook 112. Other features have been covered above and still others will be apparent without elaboration, as will variations in form and structure within the spirit and scope of the invention.

What is claimed is:

1. Control mechanism for the fuel and brake systems of a motor vehicle, comprising: a support; a fuel feed lever connected to the vehicle fuel system and pivoted to the support for movement downwardly and upwardly respectively between fuel-decrease and fuel-increase positions; means biasing said lever to its fuel-decrease position; an actuator lever pivoted to the support above the feed lever for up and down movement; means biasing the actuator lever upwardly and away from the feed lever; a single pedal mounted for forward and reverse movement between front and rear ends of a fore-and-aft control range; a force-transmitting device interconnecting the pedal and the actuator lever for movement of the two in unison so that forward and reverse movements of the pedal respectively incur downward and upward movements of the actuator lever; feed lever pick-up means carried by one lever and initially in disengaged relation to the other lever during downward movement of the actuator lever and operative to effect an interconnection between the levers at a point in downward movement of the actuator lever corresponding to an intermediate position of the pedal in its control range, said pick-up means enabling downward overtravel of the actuator lever as respects the feed lever but operative to apply a lifting force to said feed lever upon upward movement of the actuator lever as the pedal moves reversely from said intermediate position, and said pick-up means being releasable substantially when the pedal reaches the rear end of said control range so that the feed lever is automatically returned by its biasing means to its fuel-decrease position irrespective of further reverse movement of the pedal; and a brake control element connected to the vehicle brake system and biased to a rear brake-off position and movable to a forward brake-on position, said element being arranged to be engaged and moved forwardly by the pedal as the pedal moves forwardly from said intermediate position in its control range.

2. The invention defined in claim 1, in which: the pick-up means includes a hook device depending from the actuator lever and yieldable in one direction to enable it to pass the feed lever as the actuator lever moves downwardly and biased in the opposite direction to hook under the feed lever upon upward movement of the actuator lever.

3. The invention defined in claim 2, in which: the levers are so pivoted end of such length that the hook device slips off the free end of the feed lever to effect release of the feed lever substantially when the pedal reaches the rear end of its control range as aforesaid.

4. The invention defined in claim 1, including: upper and lower sheaves journaled on the support respectively above and below the actuator and feed lever pivots; and a tension spring having a generally upright run extending between the sheaves, an upper portion trained over the upper sheave and connected to the actuator lever and a lower portion trained under the lower sheave and connected to the feed lever, said upper and lower spring portions respectively constituting the aforesaid biasing means for said levers.

5. The invention defined in claim 4, in which: the connections of the spring portions respectively to the levers are so arranged relative to the lever pivots that the tension in said upper portion and the effective moment arm by which said upper portion acts to move the actuator lever upwardly increase as the actuator lever moves downwardly relative to the feed lever while the lower spring portion remains substantially static, whereby said upper spring portion is effective to move both lever upwardly against the bias in the lower spring portion when the pick-up means interconnects the levers and the pedal travels rearwardly.

6. The invention defined in claim 1, in which: the pedal travels in an arc; the actuator lever in its upper position extends in such position as to intersect said arc; the force-transmitting device includes a follower riding the actuator lever and a link connecting the follower and the pedal so that forward movement of the pedal moves the actuator lever downwardly to a pick-up position enabling interconnection of the pick-up means, and said actuator lever has an extension thereon that lies generally tangent to the arc of pedal travel when the actuator lever reaches said pick-up position whereby the follower moves onto said extension to minimize further downward travel of the actuator lever as the pedal moves further forwardly while increasing the forward movement of the brake control element.

7. The invention defined in claim 1, in which: the connection between the feed lever and the vehicle fuel system includes a fuel feed arm movable between spaced apart stops respectively establishing minimum and maximum fuel feed positions and link having a first connection at one end to the feed lever and a second connection at its other end to the feed arm so that upward and downward movement of the feed lever moves the feed arm between said stops and respectively to its maximum and minimum positions, said second connection including a one-way overrunning device enabling further upward movement of the feed lever after the feed arm is stopped at its maximum position.

8. The invention defined in claim 1, in which: the force-transmitting device includes a follower riding the actuator member; and said actuator member has a portion thereon engageable by the follower when the pedal reaches its said intermediate position, said portion presenting increased resistance to further travel of the follower so as to indicate the attainment of said intermediate pedal position, said portion being capable of being over-ridden by the follower upon further forward travel of the pedal.

9. Control mechanism for the fuel and brake systems of a motor vehicle comprising: a single controller mounted for movement from a neutral position and through an intermediate position to a final position and for reverse movement through said intermediate position and back to said neutral position; a brake control element connected to the vehicle brake system and movable between brake-off and brake-on positions and biased to said brake-off position; one-way controller-to-element force-transmitting means affording travel of the controller independently of said element in both directions between said neutral and intermediate positions and effective at said intermediate position to engage the controller with the element so that movement of the controller toward its final position causes movement of said element toward its brake-on position; a fuel feed member connected to the vehicle fuel system and movable in opposite directions between fuel-decrease and fuel-increase positions, and means biasing said member to its fuel-decrease position; an actuator member separate from the fuel feed member and movable in opposite fuel-increase and fuel-decrease directions, and means biasing said actuator member in its fuel-increase direction; a force-transmitting device interconnecting the controller and the actuator member so that movement of the controller from its neutral position to its intermediate position causes movement of the actuator member against its biasing means and in its fuel-decrease direction relative to the biased feed member; and feed member pick-up means carried by one member and initially in disengaged relation to the other member during travel of the controller from its neutral position to its intermediate position, said pick-up means being conditioned to interconnect the members to establish a one-way force-transmitting connection causing movement of the feed member toward its fuel-increase direction during reverse movement of the controller from its intermediate position toward its neutral position, and said pick-up means being releasable to disconnect the members just prior to attainment by the controller of its neutral position so that the feed member is returned to its fuel-decrease position by its biasing means.

10. The invention defined in claim 9, in which: the actuator member comprises a lever pivoted at one end for rocking toward and away from the fuel feed member; the force-transmitting device includes a follower riding the actuator member lever; and said actuator member lever has a cam portion thereon engageable by the follower when the controller reaches its intermediate position after movement from its neutral position, the engagement of the follower with said cam portion serving to indicate the attainment by the controller of said intermediate position and accordingly to indicate that the pick-up means has interconnected the members for travel thereof in unison when the controller is returned toward its neutral position.

11. Control mechanism for the fuel system of a motor vehicle, comprising: a support; a fuel feed lever connected to the vehicle fuel system and pivoted to the support for movement downwardly and upwardly respectively between fuel-decrease and fuel-increase positions; means biasing said lever to its fuel-decrease position; an actuator lever pivoted to the support above the feed lever for up and down movement; means biasing the actuator lever upwardly and away from the feed lever; a single pedal mounted for forward and reverse movement between front and rear ends of a fore-and-aft control range; a force-transmitting device interconnecting the pedal and the actuator lever for movement of the two in unison so that forward and reverse movements of the pedal respectively incur downward and upward movements of the actuator lever; and feed lever pick-up means carried by one lever and initially in disengaged relation to the other lever during downward movement of the actuator lever and operative to effect an interconnection between the levers at a point in downward movement of the actuator lever corresponding to an intermediate position of the pedal in its control range, said pick-up means enabling downward overtravel of the actuator lever as respects the feed lever but operative to apply a lifting force to said feed lever upon upward movement of the actuator lever as the pedal moves reversely from said intermediate position, and said pick-up means being releasable substantially when the pedal reaches the rear end of said control range so that the feed lever is automatically returned by its biasing means to its fuel-decrease position irrespective of further reverse movement of the pedal.

12. The invention defined in claim 11, in which: the pick-up means includes a hook device depending from the actuator lever and yieldable in one direction to enable it to pass the feed lever as the actuator lever moves downwardly and biased in the opposite direction to hook under the feed lever upon upward movement of the actuator lever.

13. The invention defined in claim 12, in which: the levers are so pivoted and of such length that the hook device slips off the free end of the feed lever to effect release of the feed lever substantially when the pedal reaches the rear end of its control range as aforesaid.

14. The invention defined in claim 11, including: upper and lower sheaves journaled on the support respectively above and below the actuator and feed lever pivots; and a tension spring having a generally upright run extending between the sheaves, an upper portion trained over the upper sheave and connected to the actuator lever and a lower portion trained under the lower sheave and connected to the feed lever, said upper and lower spring portions respectively constituting the aforesaid biasing means for said levers.

15. The invention defined in claim 14, in which: the connections of the spring portions respectively to the levers are so arranged relative to the lever pivots that the tension in said upper portion and the effective moment arm by which said upper portion acts to move the actuator lever upwardly increase as the actuator lever moves downwardly relative to the feed lever while the lower spring portion remains substantially static, whereby said upper spring portion is effective to move both levers upwardly against the bias in the lower spring portion when the pick-up means interconnects the levers and the pedal travels rearwardly.

16. Control mechanism for the fuel and brake systems of a motor vehicle, comprising: a single controller movable forwardly and reversely through consecutive fore and rear parts of a control range; a fuel feed member connected to the vehicle fuel system and movable in opposite fuel-increase and fuel-decrease directions respectively between spaced apart fuel-increase and fuel-decrease positions; first means operative between the controller and the feed member for moving the member in its fuel-decrease and fuel increase directions respectively upon forward and reverse movement of the controller only in the rear part of its range, said first means including a device enabling the controller to overrun the feed member during forward movement of the controller in the fore part of its range; a movable brake operator connected to the vehicle brake system and movable between brake-off and brake-on positions and biased to said brake-off position; second means operative between the operator and the controller for incurring the brake-on and brake-off positions of the operator respectively during forward and reverse movement of the controller only in the fore part of said range, said second means enabling movement of the controller in the rear part of its range independently of the operator; biasing means urging the feed member to its fuel-decrease position; and said device in said first means being automatically releasable to enable biased return of the member to said fuel-decrease position when the controller reaches substantially the rear extreme of the rear part of its range, said device being operative to automatically re-connect the member and controller upon movement of the controller to substantially the front extreme of the rear part of said range.

References Cited in the file of this patent

UNITED STATES PATENTS

| | | |
|---|---|---|
| 1,817,416 | Lippert | Aug. 4, 1931 |
| 2,224,441 | MacKay | Dec. 10, 1940 |
| 2,338,244 | Hayes | Jan. 4, 1944 |
| 2,352,104 | Kennedy | June 20, 1944 |